US012453562B2

(12) United States Patent
Roussouly

(10) Patent No.: US 12,453,562 B2
(45) Date of Patent: Oct. 28, 2025

(54) ROBOTIC SPINE SURGERY SYSTEM

(71) Applicant: S.M.A.I.O., Saint Priest (FR)

(72) Inventor: Jean-Charles Roussouly, Poleymieux Au Mont d'Or (FR)

(73) Assignee: S.M.A.I.O., Saint Priest (FR)

(*) Notice: Subject to any disclaimer, the term of this patent is extended or adjusted under 35 U.S.C. 154(b) by 344 days.

(21) Appl. No.: 18/110,522

(22) Filed: Feb. 16, 2023

(65) Prior Publication Data
US 2023/0263541 A1    Aug. 24, 2023

(30) Foreign Application Priority Data
Feb. 22, 2022   (FR) ...................................... 2201545

(51) Int. Cl.
A61B 34/10    (2016.01)
A61B 17/17    (2006.01)
A61B 34/20    (2016.01)
A61B 90/96    (2016.01)

(52) U.S. Cl.
CPC ...... *A61B 17/1757* (2013.01); *A61B 17/1703* (2013.01); *A61B 34/10* (2016.02); *A61B 34/20* (2016.02); *A61B 90/96* (2016.02); *A61B 2034/104* (2016.02); *A61B 2034/105* (2016.02); *A61B 2034/2055* (2016.02); *A61B 2034/2057* (2016.02)

(58) Field of Classification Search
CPC .... A61B 2034/2055; A61B 2090/3983; A61B 34/20; A61B 90/39; A61B 90/96; A61B 2034/2057; A61B 34/30; A61B 34/10
See application file for complete search history.

(56) References Cited

U.S. PATENT DOCUMENTS

| 2018/0207794 | A1  | 7/2018  | Sebring et al. |
| 2018/0318035 | A1  | 11/2018 | McLachlin et al. |
| 2020/0222121 | A1  | 7/2020  | Ignasiak |
| 2020/0222122 | A1  | 7/2020  | Snyder et al. |
| 2020/0237445 | A1* | 7/2020  | Snyder .................. A61B 34/30 |

FOREIGN PATENT DOCUMENTS

WO    2020/055707    3/2020
WO    2021/069449    4/2021

OTHER PUBLICATIONS

Search Report for FR Application No. 2201545 dated Oct. 10, 2022, 2 pages.

* cited by examiner

*Primary Examiner* — Samuel S Hanna
(74) *Attorney, Agent, or Firm* — NIXON & VANDERHYE

(57) ABSTRACT

The disclosed spine surgery system includes preoperative mapping data relating to a patient vertebra, a vertebral localization element having a mating surface specific to the patient able to be coupled to the vertebra in a unique fixed position and a three-dimensional optical marker, a robot including a movable arm and carrying an end effector member, an optical sensor device at least partially carried by the end effector member and able to observe the marker of the vertebral localization member and deducing therefrom, in real time, the relative positioning data between this marker and the end effector member, and a processing unit that determines in real time the relative positioning between the end effector member and the vertebra, by calculating, in a three-dimensional spatial frame, the position of the end effector member and by it with a region of space occupied by the vertebra as modeled.

20 Claims, 12 Drawing Sheets under 35 USC 119(a)
ROBOTIC SPINE SURGERY SYSTEM

This application claims the priority under 35 USC 119(a) of French patent application 2201545 filed on Feb. 22, 2022, the entirety of which is incorporated herein by reference.

BACKGROUND OF THE INVENTION

Field of the Invention

The present invention relates to a spine surgery system.

Description of the Related Art

In vertebral surgery, robotics plays an increasing role mainly to help the surgeon to position screws in the pedicles of the vertebrae of the patient or the interbody cages in the intervertebral discs of the patient. The technologies commonly used involve a robotic arm including, an end effector member, a sighting guide which is typically tubular.

Intraoperatively, in other words, during surgery, the spine of the patient is scanned and a three-dimensional optical marker is fixedly positioned on the spine. This marker makes it possible to establish a spatial frame in which the screws and other implants are, thanks to software processing tools developed for this purpose, positioned virtually within calibrated images of the spine, obtained by X-ray imaging in the operating room using, for example, an intraoperative scanner or an image intensifier. The positioning coordinates of the implants being provided in the reference mark of the marker attached to the spine, the visualization of this marker during surgery by a camera, the position of which is known relative to that of the fixed station, on which the robotic arm rests, allows to control the latter by positioning its end effector member in space in such a way that the sighting guide formed by this end effector member enables the surgeon to perform the surgical implantation acts in a precise and secure manner. An example of this kind of system is disclosed in US 2020/222121 A1 where a surgical assistance robot and a navigation device are associated. The navigation device allows the three-dimensional optical markers to be tracked in space, in particular a marker carried by the robot, a marker carried by a terminal effector member of the robot, a marker fixed to the patient, a marker carried by a hand instrument, and a marker carried by an imaging device, in particular an intraoperative scanner. To this end, the navigation device includes a multi-camera optical locator which supplies images in which the various aforementioned markers appear. The marker attached to the patient includes a fixation member, such as a clamp, able to grip either one or other of the vertebral processes of the spine of the patient, so that the spine of the patient can be followed by the navigation device in a spatial frame defined by this marker. In order to position the spatial frame defined by the marker attached to the patient in a navigation marker, the user must identify the location of this marker in the navigation marker, using the tool to hand. Then a processing unit of the navigation system calculates a map to correlate the different spatial frames with each other. Similar considerations apply to the various other markers, in particular the marker carried by the end effector member of the robot. Therefore, it is understood that the system of US 2020/222121 A1 is able to determine, intraoperatively, the relative positioning of the end effector member, of the marker fixed to the patient and of the images of the spine of the patient, taken by the intraoperative imaging device.

However, this technique suffers from several limitations. Firstly, it requires the use of intraoperative X-ray imaging devices, thereby inducing heavy investments for the care establishment, systematic irradiation of the patient and the surgical team, and operating constraints, linked to the wearing of lead aprons, to movements in the operating room to avoid irradiation, etc. Secondly, it forces the surgeon, according to a time-consuming process, to recognize each instrument by the camera, which poses problems of occlusion when an object forms a screen between the camera and the object that the camera follows and which it is supposed to permanently indicate the position relative to the marker attached to the spine of the patient. If the patient moves even slightly, the surgeon is obliged to start the whole process of recognizing the instruments again, or even to perform a new complete CT scan of the patient.

Consequently, the repositioning techniques, based on very high precision cameras, often infrared, have recently been developed. They allow very precise intraoperative photography of the surface of the anatomical area concerned to locally compare its texture with that of the same object scanned preoperatively. The images of the preoperative scanner are then positioned in space superimposed on the photographed area as if they had been scanned in the operating room. It is then possible to control a robotic arm according to planned trajectories which are readjusted relative to the vertebrae. While they reduce irradiation during surgery and allow instantaneous reacquisition of relative positioning in the event of unexpected movement of the marker attached to the spine of the patient, these repositioning techniques require the development of complex image analysis algorithms and the use of very expensive cameras, without fundamentally changing the situation concerning the heaviness of the initial phase in the operating room.

In addition, these different techniques present problems of precision, in the sense that the further the implantation zone is from the marker fixed to the spine of the patient, the less the precision of the positioning is because of the movements of the vertebrae between them, which may differ from the movements followed by the marker attached to a distinct vertebral segment. Due to this lack of precision, the actions performed by the robot are often limited to the positioning of a sighting guide, burdening the surgeon with performing the actual surgical action, such as a drilling action, with no gain in time relative to a gesture performed without a robot, and sometimes with the risk of the surgical tool slipping on the vertebra.

SUMMARY OF THE INVENTION

An aim of the present invention is to propose a new approach to robotic spine surgery, which, while being simple and inexpensive to implement, allows the robotic arm to be positioned precisely and securely relative to the vertebrae of a patient to be operated on.

To this end, an object of the invention is a spine surgery system including:
  preoperative mapping data relative to one or more vertebrae of a patient, such preoperative mapping data being especially provided by dedicated bone mapping means,
  a vertebral localization element which is provided with:
    a mating surface which is specific to the patient, being congruent with a predetermined bony part of the vertebra or one of the vertebrae, so as to be able to couple the vertebral localization element to the vertebra in a unique fixed position, by applying the mating surface in customized contact with bony material of this vertebra so that the mating surface covers the predetermined bony part of the vertebra, by matching the bony reliefs of the predetermined bony part and by cooperating by contact with these bony reliefs to place the vertebral localization element on the vertebra in said unique fixed position, and a three-dimensional optical marker, defining a three-dimensional spatial frame which is fixedly linked to the mating surface so that, when the vertebral localization element is coupled to the vertebra, said three-dimensional spatial frame is fixedly linked to the vertebra according to a relative position resulting from the coupling of the vertebral localization element to the vertebra in said unique fixed position, a robot comprising an arm which is movable relative to a fixed station of the robot, as well as an end effector member which is carried by the arm and which is able to be applied intraoperatively to the vertebra, an optical sensor device, which is at least partially carried by the end effector member and which is able to, when the vertebral localization element is coupled to the vertebra, observe the three-dimensional optical marker of the vertebral localization element and deduce in real time positioning data concerning the relative position between the three-dimensional optical marker and the end effector member, and processing unit which, from said preoperative mapping data and said positioning data, determines in real time the relative position between the end effector member and the vertebra, by calculating, in said three-dimensional spatial frame, the position of the end effector member and by comparing this position of the end effector member with a region of space occupied by the vertebra as modeled by said preoperative mapping data.

Another object of the invention is a spine surgery method, wherein:

preoperative mapping data is available relative to one or more vertebrae of a patient to be operated on, a vertebral localization element is produced which is provided with:
  a mating surface which is specific to the patient, being congruent with a predetermined bony part of the or one of the vertebrae, so as to be able to couple the vertebral localization element to the vertebra in a unique fixed position, in applying the mating surface in customized contact with bony material of this vertebra so that the mating surface covers the predetermined bony part of the vertebra, by matching the bony reliefs of the predetermined bony part and in cooperating by contact with these bony reliefs to place the vertebral localization element on the vertebra in said unique fixed position, and
  a three-dimensional optical marker, defining a three-dimensional spatial frame which is fixedly linked to the mating surface so that, when the vertebral localization element is coupled to the vertebra, said three-dimensional spatial frame is fixedly linked to the vertebra according to a relative position resulting from the coupling of the vertebral localization element to the vertebra in said unique fixed position, a robot is also available comprising an arm which is moveable relative to a fixed station of the robot, as well as an end effector which is carried by the arm and which is able to be applied intraoperatively to the vertebra, after the vertebra has been exposed, the vertebral localization element is intraoperatively coupled to the vertebra in said unique fixed position whereas the three-dimensional optical marker of the vertebral localization element is observed by an optical sensor device which is at least partially carried by the end effector member and which deduces in real time positioning data concerning the relative positioning between the three-dimensional optical marker and the end effector member, and from the preoperative mapping data and from the positioning data, the relative positioning between the end effector member and the vertebra is determined in real time, by calculating, in said three-dimensional spatial frame, the position of the end effector member and comparing this position of the end effector member with a region of space occupied by the vertebra as modeled by said preoperative mapping data.

Thus, the invention is based on preoperative mapping data relating to the or each vertebra of a patient to be operated on, this data being typically derived from preoperative CT scan images. As detailed below, this preoperative mapping data is advantageously segmented, to isolate the vertebra, and/or advantageously form the subject of selections relative to anatomically remarkable regions of the vertebra and/or are advantageously coupled to planning data relating to a surgical act to be performed on the vertebra. In all cases, the invention makes use of at least part of this preoperative mapping data so that a vertebral localization element is developed and manufactured: on the one hand, this vertebral localization element is specific to the patient, more precisely to the concerned vertebra of the latter, by having a mating surface which allows to fixedly link the vertebral localization element to the vertebra in a unique position, by cooperation in customized contact with the bony material of the vertebra, in particular the bony material of one or more of the aforementioned anatomically remarkable regions; on the other hand, the vertebral localization element allows to localize the vertebra in space optically, and this, thanks to a three-dimensional optical marker allows to define a spatial frame which is fixedly linked to the vertebra when, during the surgery, the vertebral localization element is coupled to the vertebra. The invention is also based on the use, in the operating room, of both a robot, the motorized moveable arm of which is provided with an end effector member, and an optical sensor device which is at least partially carried by the end effector member. This optical sensor device gives, in a way, eyes to the robot in the sense that this device allows to determine in real time the relative positioning between the end effector member of the robot and the marker of the vertebral localization element coupled to the vertebra, through the observation of this marker by the optical sensor device. By using both the preoperative mapping data and the data relating to the positioning between the end effector member and the marker of the vertebral localization element, the invention provides for the calculation in real time of the relative position between this end effector member and the vertebra; in other words, the position of the end effector member is calculated in real time within the reference which is defined by the marker of the vertebral localization element and is fixedly linked to the vertebra as modeled in this same reference by the preoperative mapping data. The invention thus allows to identify, in real time and with precision, the end effector member relative to the vertebra, more precisely relative to the preoperative modeling of the vertebra, in a simple and economical manner, in particular by avoiding the use intraoperatively, of both an X-ray imaging device, such as an image intensifier or an intraoperative scanner, as well as complex image analysis algorithms to reconcile. Thanks to the invention, it is then possible to make the robot follow control instructions which take into account, in real time, the position of the vertebra relative to the end effector member of the robot; in particular, the intraoperative displacement of the end effector member for the purpose of performing or assisting a surgical act can then take into account any possible movement of the vertebra, linked for example to the breathing of the patient, to spasms of the patient or to an unexpected external shock suffered by the operating table on which the patient is resting. In practice, as explained in more detail below, the optical sensor device belonging to the system in accordance with the invention can take various embodiments; a particularly advantageous embodiment, in particular because of its simplicity and its performance, consists in that this optical sensor device comprises a three-dimensional camera which is carried by the end effector member of the robot and which, on its own, supplies the data relative to the positioning between this end effector member and the marker of the vertebral localization element. In all cases, and as also explained in more detail below, the optical sensor device advantageously allows to read a barcode, two-dimensional or three-dimensional, of the vertebral localization element, in order to access the information integrated into this barcode, such as, among other things, the identification of the vertebra with which the vertebral location element is specifically associated, preoperative planning data relating to a surgical procedure that the robot must perform or assist, etc.

According to additional advantageous features of the spine surgery system in accordance with the invention, taken in isolation or according to all technically possible combinations:

The spine surgery system also includes a planner, which is able to plan preoperatively at least one surgical act to be performed on the vertebra and to calculate the planning data corresponding to this surgical act, based on the preoperative mapping data, in which the end effector member is equipped with a tool able to perform the surgical act, and the processing unit developed in real time, from the calculation of the relative positioning between the end effector member and the vertebra, calculated by the processing unit, and from said planning data, the control instructions sent to the robot to cause the tool of the end effector to be applied directly to the vertebra by the arm so as to perform said surgical act.

The vertebral localization element is provided with a barcode, integrating information relating to the identification of the vertebra to which the vertebral localization element is to be coupled, and the optical sensor device is able, when the vertebral localization element is coupled to the vertebra, to observe and read the barcode.

The barcode also incorporates information corresponding to the planning data.

The barcode is two-dimensional, being for example a QR code or a Data Matrix code.

The barcode is three-dimensional and constitutes at least in part the three-dimensional optical marker of the vertebral localization element.

The optical sensor device includes a three-dimensional camera, which is carried by the end effector member and which determines said positioning data.

The optical sensor device includes a three-dimensional optical marker, which is distinct from the three-dimensional optical marker of the vertebral localization element and which is carried by the end effector member, and at least two two-dimensional cameras which are able, when the vertebral localization element is coupled to the vertebra, to observe according to respective viewing angles, which are different the one from the other, at the same time as the three-dimensional optical marker of the vertebral localization element and the three-dimensional optical marker of the optical sensor device and deducing said positioning data therefrom in real time.

the mating surface is designed to be applied in customized contact with the bony material of only one half, left or right, of the vertebra.

the mating surface is designed to be applied in customized contact with the bony material of the left half of the vertebra and the bony material of the right half of the vertebra simultaneously.

According to additional advantageous features of the spine surgery method in accordance with the invention, taken in isolation or according to all the technically possible combinations:

At least one surgical act to be performed on the vertebra is planned preoperatively and the planning data corresponding to this surgical act is calculated, which is based on the preoperative mapping data; the end effector member is fitted with a tool able to perform the surgical act; and from the calculation of the relative positioning between the end effector member and the vertebra, as well as from the planning data, the control instructions sent to the robot are developed in real time so that the tool of the end effector member is applied directly to the vertebra by the arm in order to perform the surgical act.

The surgical act consists of drilling a hole in the vertebra; the planning data includes the orientation of the central axis of the hole relative to the vertebra, the entry point of the hole on the vertebra, and the depth of the hole in the vertebra; and the tool is a drill bit.

At least one assistance action for a surgical act to be performed on the vertebra is planned preoperatively and the planning data corresponding to this assistance action is calculated, which is based on the preoperative mapping data; the end effector member is equipped with an ancillary device able to perform the assistance action; and from the calculation of the relative positioning between the end effector member and the vertebra, as well as from the planning data, the control instructions developed in real time are sent to the robot so that the ancillary device is placed vis-a-vis the vertebra by the arm so as to perform the assistance action, while the surgical act is carried out by the surgeon, being assisted by the ancillary device.

The preoperative mapping data comes from CT scan images of the vertebrae.

The mating surface is fabricated using preoperative mapping data.

Among the preoperative mapping data, preoperative data, so called data of interest, is selected, which relates to at least one anatomically remarkable region of the vertebra, and the mating surface is fabricated using the data of interest in a manner, intraoperatively, to be applied in customized contact with the bony material of said at least one anatomically remarkable region.

The preoperative mapping data is segmented so as to form groups of data which are respectively relative to the vertebrae of the patient.

Intraoperatively, the patient is anesthetized and lying on his stomach on an operating table which is fixed relative to the fixed station of the robot.

No X-ray imaging device is used intraoperatively.

BRIEF DESCRIPTION OF THE DRAWINGS

The invention will be better understood on reading the following description, given solely by way of example and made with reference to the drawings in which.

DESCRIPTION OF THE PREFERRED EMBODIMENTS

FIGS. 1 to 7 show parts of a spine surgery system, this system being referenced S below. The system S allows to implement a spine surgery method which will be described as and when the parts of the system S are described below. For example, as repeated below, the method aims to implant pedicle screws into the vertebrae of a human patient. The example illustrated in the figures relates to five vertebrae, namely vertebrae which are noted V1 to V5 subsequently and which correspond to the lumbar vertebrae of the patient, but the invention is obviously not limited by the number and/or the position of the vertebrae to which the system S and the spine surgery method are applied.

In all cases, as explained in detail below, the method includes preoperative steps, that is to say steps implemented before any surgical act, strictly speaking, applied to the body of the patient to be treated, and intraoperative steps, that is to say implemented on the body of the patient being treated. The preoperative steps are implemented by a competent operator, using parts of the system S which will be described in particular in relation to FIGS. 1 to 4. These preoperative steps can be implemented several days before the intraoperative steps, which are implemented by a surgeon or a similar health professional, using parts of the system S that will be described in relation to FIGS. 5 to 7. Unlike the preoperative steps, the intraoperative steps are necessarily implemented in an operating room of a care facility.

Figure 1:
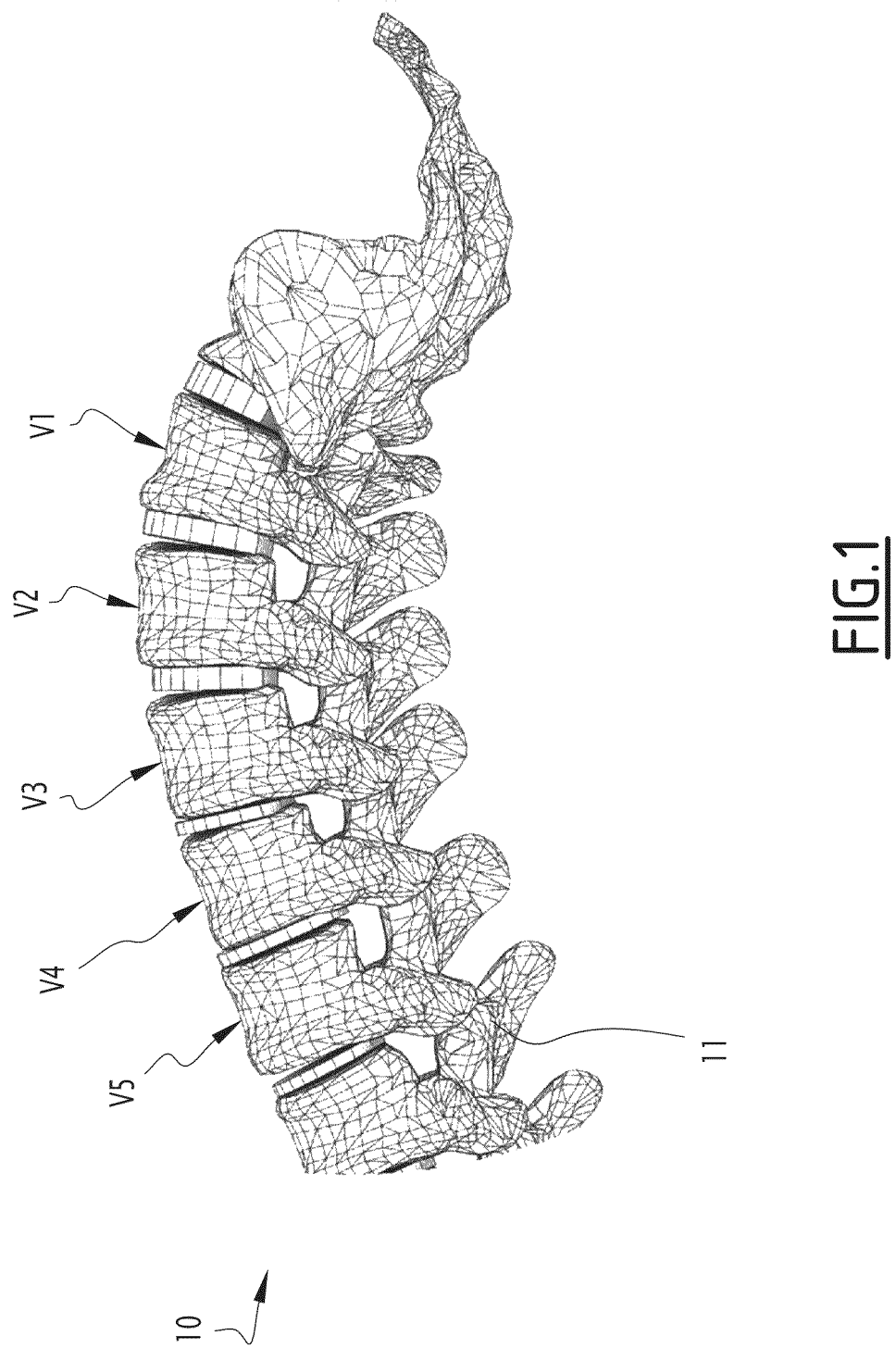
FIG. 1 is a diagram illustrating part of a system in accordance with the invention.

As illustrated in FIG. 1, the system S includes bone mapping means 10 which provides preoperative mapping data relative to one or more of the vertebrae of the patient to be operated on, that is to say to the vertebrae V1 to V5 in the example considered. This mapping means 10 allows to implement an initial step of the method, in which the operator has the aforementioned preoperative mapping data, by means of the bone mapping means 10. In the example illustrated in FIG. 1, the preoperative mapping data is integrated into a scanner image 11, belonging to the bone mapping means 10, that is to say, a tomographic image obtained by preoperative irradiation of the vertebrae V1 to V5. In practice, several scanner images belonging to the bone mapping means 10, such as the image 11, provides the aforementioned preoperative mapping data. In all cases, this preoperative mapping data provides a morphological grid of the bone structures of the vertebrae V1 to V5, as schematically illustrated in FIG. 1. The acquisition of such preoperative mapping data relative to the bony material of the vertebrae being well known in the domain, it will not be detailed here further.

Figure 2:
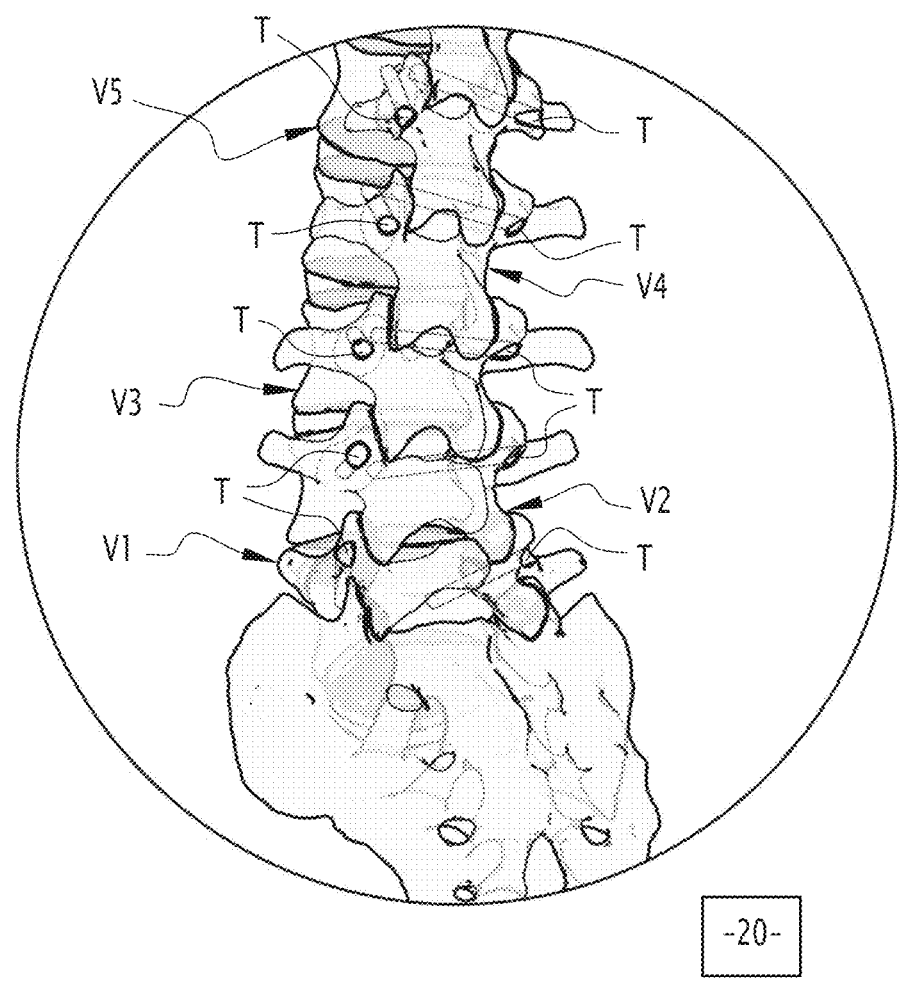
FIGS. 2 to 4 are views similar to FIG. 1, respectively illustrating other parts of the system.

As illustrated by FIG. 2, the system S advantageously includes a planner 20 which allows to plan one or more surgical procedures to be performed on the vertebrae V1 to V5 in the preoperative period, as well as to calculate planning data corresponding to these surgical procedures, based on the preoperative mapping data supplied by the bone mapping means 10. The planner 20 is, for example, a software device able to process the preoperative mapping data. In all cases, the planner 20 allows to implement a step of the method, called planning, which is subsequent to the initial step and in which the operator plans the aforementioned surgical acts. In the example illustrated in FIG. 2, these surgical acts consist in drilling holes T in the vertebrae V1 to V5, intended to receive the pedicle screws mentioned above. In this planning step, the operator determines, using the planner 20, the planning data corresponding to the surgical acts, by characterizing the implementation parameters. The definition of planning data is based on the preoperative mapping data, in the sense that the planning data is defined relative to the preoperative mapping data. In the example considered here in connection with the holes T to be drilled in the vertebrae V1 to V5, the operator thus determines, in particular by calculation, the entry point of each hole T on the vertebra concerned, the orientation of the central axis of each hole T relative to the vertebra concerned, and the depth of each hole T in the vertebra concerned, taking into account the size of the pedicle screw to be placed in the hole. The planning data is advantageously displayed, by the planner 20, superimposed on the preoperative mapping data, as illustrated schematically in FIG. 2. In practice, the specificities relative to this planning step and to the planner 20 are not limiting to the invention, it being noted that various planning techniques are known in the field.

Figure 3:
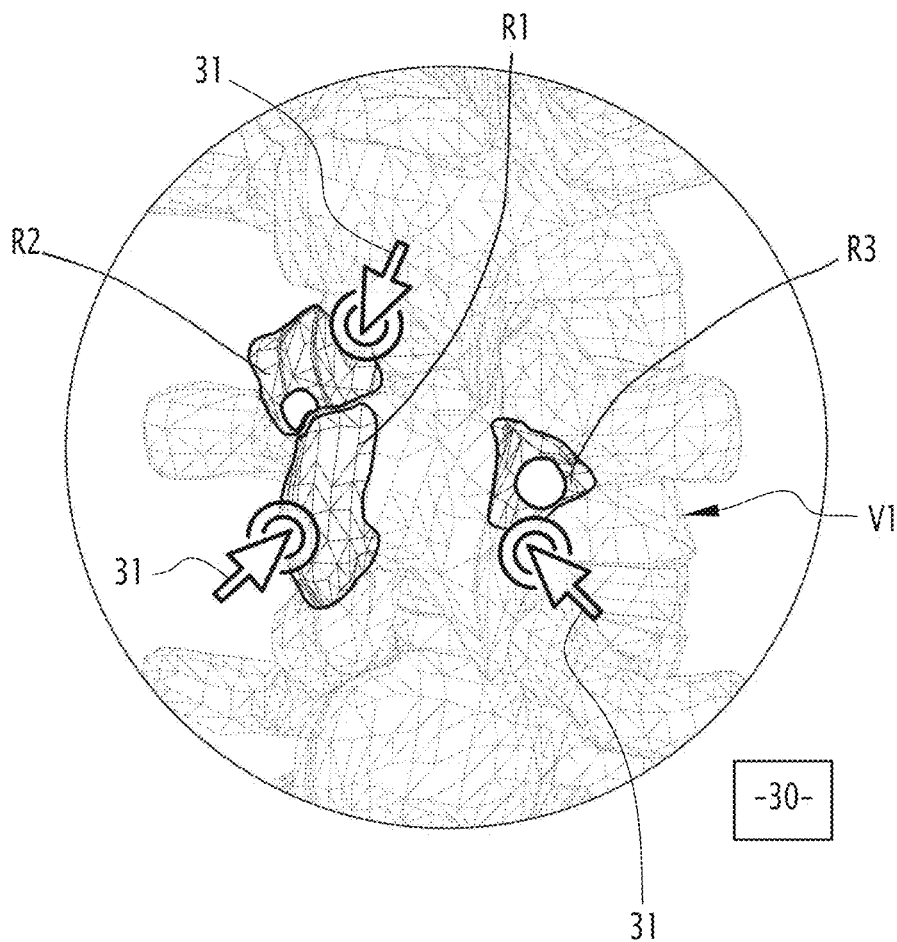

As illustrated by FIG. 3, the system S also advantageously includes a selector 30 which allows to select preoperatively, from among the aforementioned preoperative mapping data, the data, said to be of interest, which relates to one or more anatomically remarkable regions of each of the vertebrae V1 to V5. The selector 30 is, for example, a software device able to process the preoperative mapping data which is provided by the bone mapping means 10. In all cases, the selector 30 allows to implement a step of the method, which is necessarily subsequent to the initial step, while being advantageously implemented after the planning step, and in which the aforementioned data of interest is selected. In FIG. 3, the vertebra V1 is thus associated with three anatomically remarkable regions, respectively referenced R1, R2 and R3. During the selection step, the operator uses the selector 30 to identify, among the preoperative mapping data, and where applicable supplemented by the planning data, the anatomically remarkable regions of each of the vertebrae, typically through a display of this data which allows the operator to point to each of the anatomically remarkable regions, as illustrated schematically in FIG. 3 where three arrow shaped pointers 31 are drawn. The selector 30 advantageously allows to automatically extend the selection around the points carried out by the operator, in order to thus obtain, for each vertebra, corresponding portions of the grid formed by the preoperative mapping data, so that these portions of the grid describe respectively the anatomically remarkable regions. As a variant, the selection of the anatomically remarkable regions can be at least partially operated automatically by the selector 30 provided that the latter are programmed accordingly, in particular by learning. In all cases, the part of the preoperative mapping data, which corresponds to the anatomically remarkable region or regions of each vertebra, constitutes the aforementioned data of interest and is identified in an ad hoc manner, in particular by being kept in full, this data of interest being intended to be exploited during subsequent steps of the method, as explained below. Conversely, the rest of the preoperative mapping data can be ignored or processed to limit its computer size. In practice, the anatomically remarkable region or regions of each vertebra are typically those with which the surgical procedures planned at the planning stage interfere, as well as, where applicable and for reasons which will appear later, the spinous process of the vertebra, such as the region R1 for the vertebra V1 in FIG. 3, and/or the left and right laminae of the vertebra, such as the regions R2 and R3 of the vertebra V1, and/or the left and right articular processes of the vertebra, and/or the left and right transverse processes of the vertebra.

Figure 4:
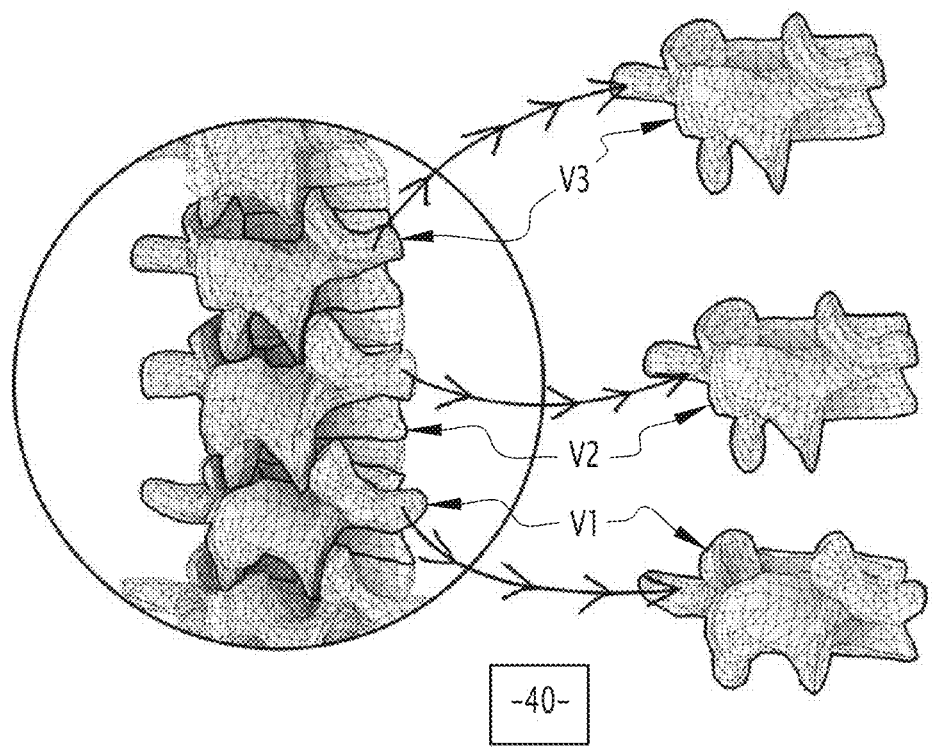

As illustrated by FIG. 4, the system S also advantageously includes a segmentor which allows to segment the preoperative mapping data, supplied by the bone mapping means 10, so that this data forms groups of data which are respectively relative to the vertebrae V1 to V5 of the patient. The segmentor 40 is, for example, a software device able to process the preoperative mapping data. In all cases, this segmentor 40 allows to implement a step of the method, which is necessarily subsequent to the initial step and in which the preoperative mapping data is segmented to form the aforementioned groups of data, respectively relative to the vertebrae V1 to V5. During this segmentation step, the segmentor 40 processes the preoperative mapping data to delimit the contours of each of the vertebrae V1 to V5 and thus distinguish them individually vis-à-vis the others and vis-à-vis the rest of the spinal column, as indicated schematically for the vertebrae V1 to V3 in FIG. 4. Each vertebra thus distinguished corresponds to a corresponding portion of the grid formed by the preoperative mapping data, this portion of the grid forming the group of data relative to the vertebra concerned. It is understood that some of the initial preoperative mapping data, that is to say provided by the bone mapping means 10, is not found in the aforementioned groups of data. In other words, the volume of data, constituted of all of the aforementioned data groups, is less than the volume of the preoperative mapping data of the initial stage. In practice, the processing carried out by the segmentor 40 can advantageously be automatic, that is to say that it is based on algorithms that do not require the intervention of the operator, apart from their possible activation. Whatever the implementation specifics of the segmentation step, the latter is carried out before or after the planning and/or selection steps.

In practice, the same software device can advantageously integrate the respective functionalities of the planner 20, the selector 30 and the segmentor 40.

In all cases, at the end of the preoperative steps which are the initial step and the steps of planning, selection and segmentation, the preoperative mapping data, which, where applicable, is advantageously limited to the groups of data resulting from the segmentation step and which advantageously integrate the definition of the data of interest selected at the selection step, as well as the planning data, are saved in an exportable computer format, well known in the field. The set of all this data is designated below by the reference E.

Figure 5:
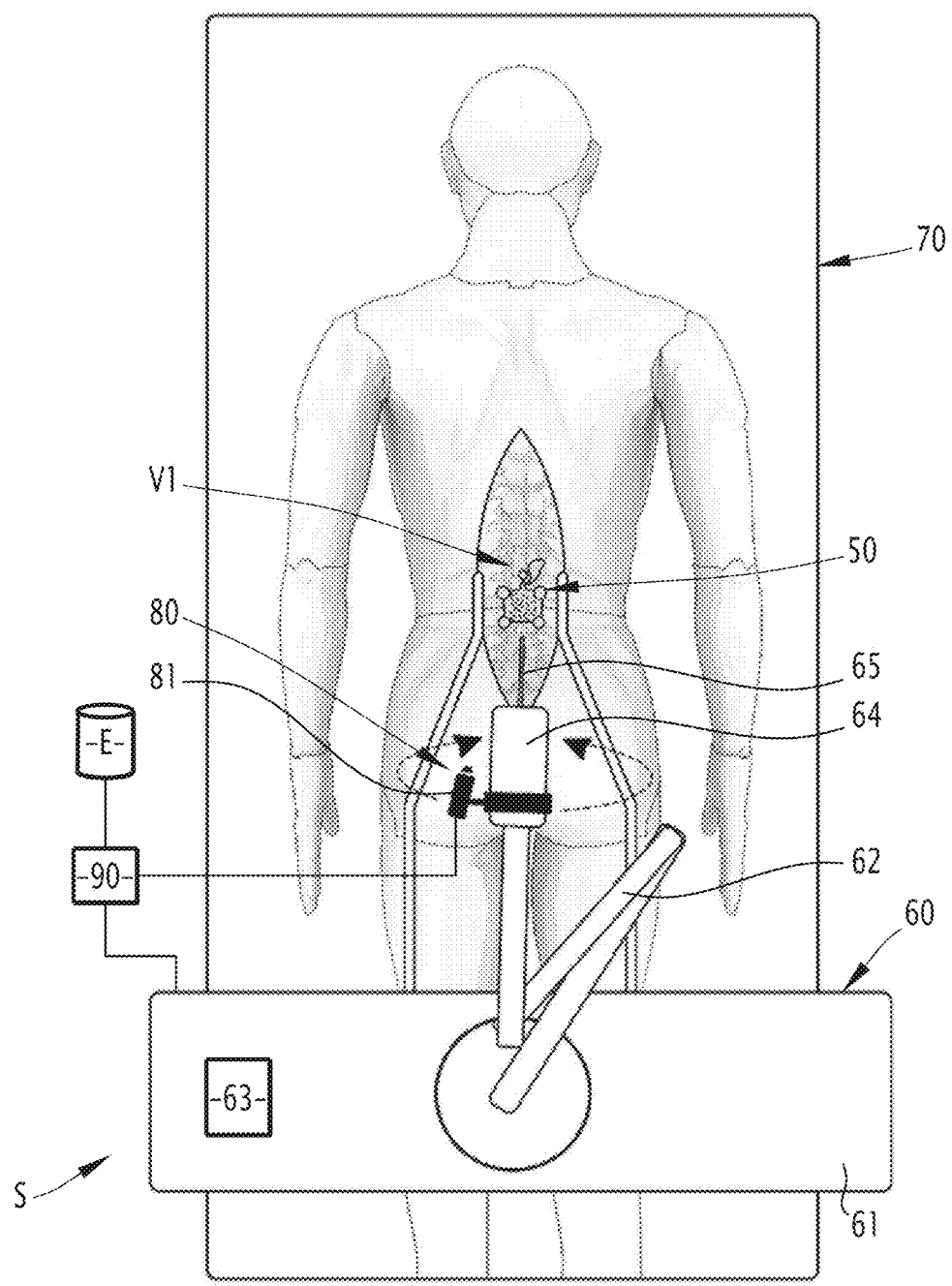
FIG. 5 is also a diagram illustrating yet other parts of the system.

As shown in FIG. 5, the system S furthermore includes a vertebral localization element 50 which allows it to localize in space a vertebra with which this vertebral localization element is associated. In the example considered in the figures, the vertebral localization element 50 is thus associated with the vertebra V1, as clearly visible in FIGS. 6 and 7.

The vertebral localization element 50 is specific to the patient, more precisely to a vertebra of this patient, here the vertebra V1, in the sense that, as explained below, the vertebral localization element 50 is designed in a customized manner for the patient considered, by being made to measure to correspond to the negative of the bony topography of certain zones of the vertebra V1, subsequently qualified as the predetermined bony part of this vertebra V1. In the embodiment considered in FIGS. 5 to 7, the vertebral localization element 50 has the specificity in that it can be applied to either right or left side of the vertebra, in the sense that, as also explained subsequently, it is designed to be applied exclusively to one half, left or right, of the vertebra to which it is associated, without interacting with the other half of this vertebra. By way of example illustrated in FIGS. 5 to 7, the vertebral localization element 50 is thus specifically adapted to the right half of the vertebra V1.

The vertebral localization element 50 includes a body 51 which presents opposite sides, respectively proximal and distal. When the localization vertebral element 50 is used on the vertebra V1, the distal side of its body 51 is turned towards the vertebra V1, in particular toward the posterior side of this vertebra. In the embodiment considered here, the vertebral localization element 50 includes a proximal part 52 and a distal part 53, which are fixedly connected to each other by an intermediate part 54 of the body 51, which is advantageously tapered.

The body 51 is provided, on its distal side, with a mating surface 55 which is here delimited by the distal part 53. The mating surface 55 allows it to mechanically couple the body 51 to the bony material of the vertebra 1, here of the right half of the vertebra 1, and is specific to the patient so as to be able to be applied in customized contact with this bony material, and this in a unique fixed position. For this purpose, the mating surface 55 is morphologically adapted to the vertebra 1, being congruent with the predetermined bony part of the vertebra V1, this predetermined bony part being preferentially located on the posterior side of the vertebra. When the mating surface 55 is applied to the right half of the vertebra V1, the mating surface 55 thus covers the predetermined bony part of the vertebra V1, by matching the bony reliefs and by cooperating by contact with the latter, to place the vertebral localization element 50 on the vertebra V1 in the aforementioned unique fixed position. The uniqueness and stability of the position resulting from the adjustment of shapes between the predetermined bony part of the vertebra V1 and the morphologically adapted mating face 55.

In practice, the shaping of the mating surface 55 is carried out preoperatively, advantageously from the preoperative mapping data provided by the bone mapping means 10, which relates to the vertebra V1, in particular to the predetermined bony part of this vertebra. This preoperative mapping data is used preoperatively to shape the mating surface 55 so that the latter adopts the topographical negative of the morphological grid of the predetermined bony part of the vertebra V1. This shaping is implemented by any appropriate manufacturing technique, in particular by additive manufacturing, otherwise called three-dimensional printing, and this in a manner known per se. Advantageously, the predetermined bony part of the vertebra V1 corresponds to at least one of the anatomically remarkable regions of this vertebra, which have been described above in connection with the selector 30; that is to say that the mating face 55 is designed to be applied in customized contact with the bony material of one or more of these anatomically remarkable regions of the vertebra V1: the preoperative mapping data which is effectively exploited to shape the mating surface 55 is thus advantageously included in the data of interest having been selected by the selector 30 during the selection step which was described above.

Figure 6:
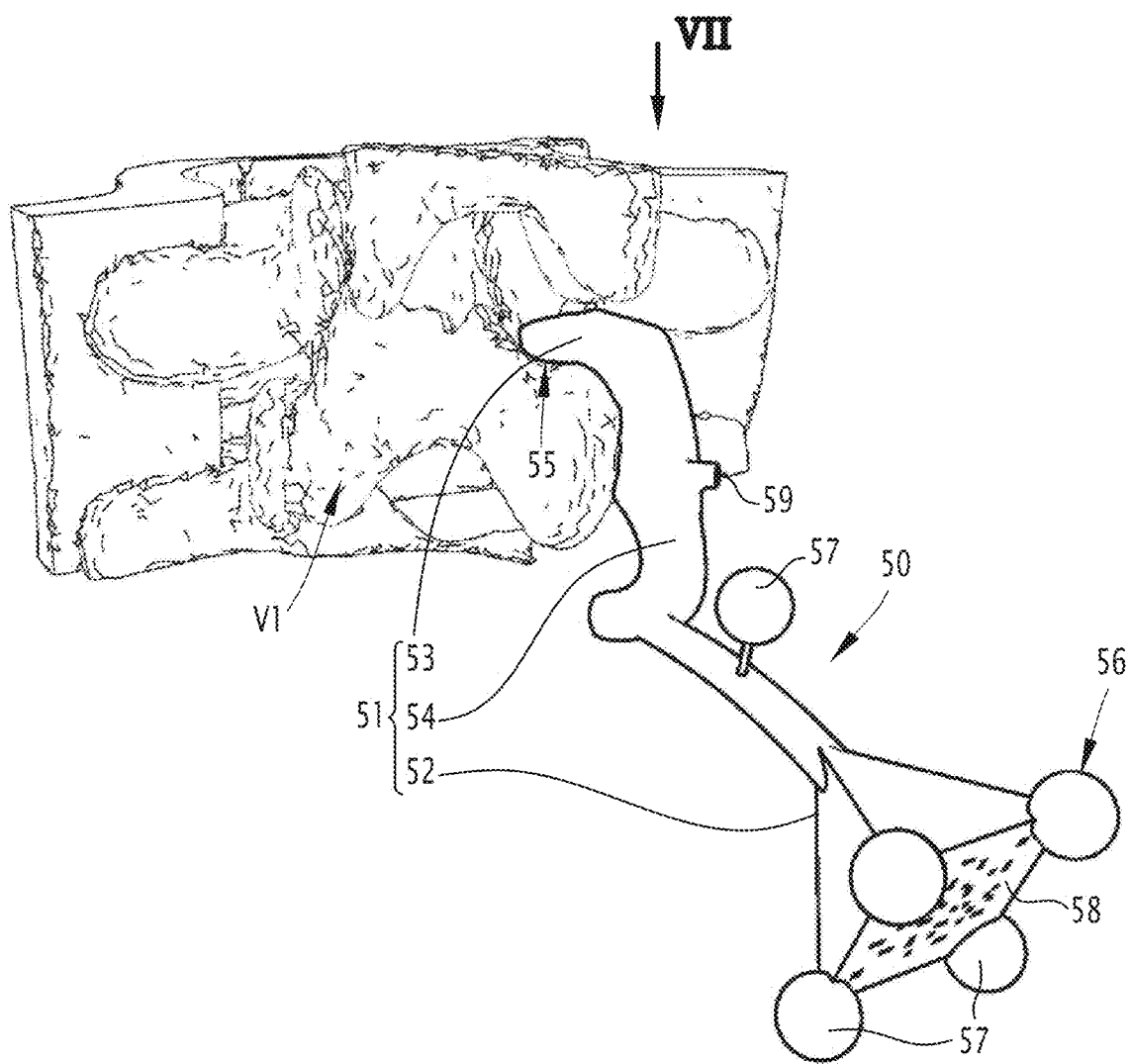
FIG. 6 is a larger scale view of one of the parts shown in FIG. 5.
Figure 7:
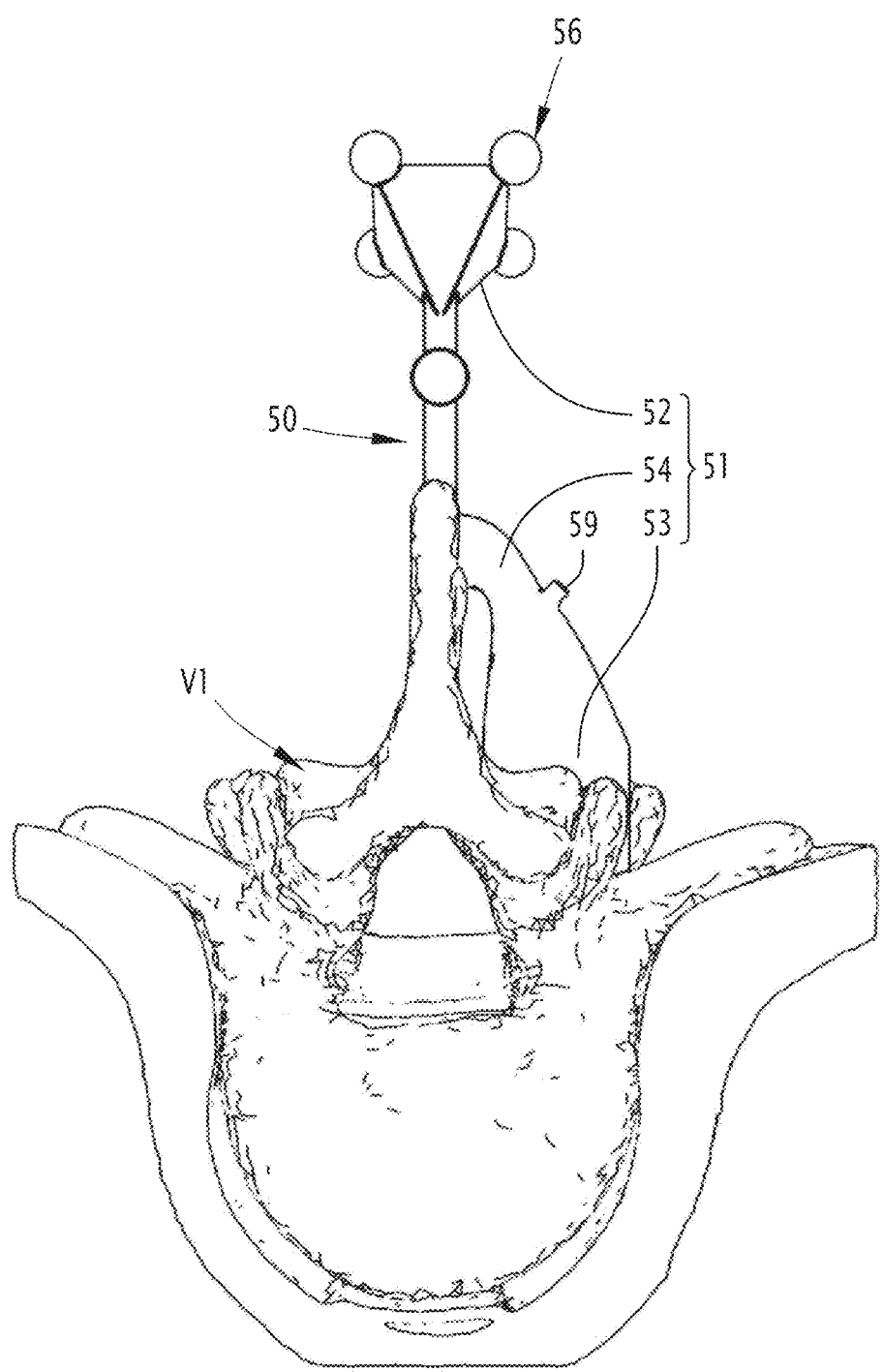
FIG. 7 is an elevation view along the arrow VII of FIG. 6.

The body 51 of the vertebral localization element 50 is further provided with a marker 56 which is delimited here by the proximal part 52 of the body 51. This marker 56 is a three-dimensional optical marker which, as explained in more detail below, is designed to be observed and tracked by suitable optical means. In FIGS. 5 to 7, the marker 56 includes the balls 57 which are fixedly distributed on the body 51. Other embodiments, known as such in the field, are possible for the marker 56 as long as the latter defines a three-dimensional spatial frame, which is fixedly linked to the body 51 and thereby to the mating surface 55, by the structure of this body 51. When the vertebral localization element 50 is coupled, by means of its mating surface 55, to the vertebra V1, the mark defined by the marker 56 is thus fixedly linked to the vertebra V1, and this with a relative positioning which is known due to the coupling of the vertebral localization element 50 to vertebra V1 in the aforementioned unique fixed position.

According to an advantageous optional arrangement, which is illustrated in FIGS. to 7, the body 51 of the vertebral localization element 50 is provided with a two-dimensional barcode 58, which is here delimited by the proximal part 52 of the body 51, advantageously adjacent to the marker 56. The embodiment of this two-dimensional barcode 58 is not limiting, the barcode 58 being for example a QR code or a Data Matrix code. In all cases, and by very definition, the barcode 58 integrates information which is coded in graphic form using graphic symbols which, typically, meet pre-established standards. For reasons which will appear later, the barcode 58 thus integrates information relating to the identification of the vertebra to which the vertebral localization element 50 is coupled, in other words, here, to the identification of the vertebra V1; advantageously, the barcode 58 also integrates information corresponding to the planning data described above, in connection with the planner 20, for the vertebra V1. In all cases, obtaining the barcode 58 and integrating it into the body 51, in particular into the proximal part 52 of the latter, involves techniques which are known per se and which will therefore not be detailed here further.

According to another advantageous optional arrangement, which is also illustrated in FIGS. 5 to 7, the body 51 of the vertebral localization element 50 is also provided with at least one cannula 59 which is here delimited by the intermediate part 54 of the body 51. The cannula 59 allows to receive a removable bone anchoring element, such as a pin. Thus, during the use of the vertebral localization element 50 and once the mating surface 55 is applied to the vertebra V1 in the aforementioned unique fixed position, the body 51 can, if necessary, be locked onto the vertebra V1 in this unique fixed position, by introducing a pin into the vertebra V1 via the cannula 59. In this way, the body 51 does not have to be continuously held manually during use of the vertebral localization element 50, without running the risk of it moving relative to the vertebra. The body 51 can thus advantageously be devoid of a corresponding gripping element, such as a handle.

In practice, the body 51 is fabricated preoperatively by any suitable technique. The additive manufacturing techniques, mentioned above for the manufacture of the mating surface 55, can be envisaged for manufacturing the entire distal part 53, or even the entire body 51. Alternatively, at least the intermediate part 54 is prefabricated according to a fixed geometry, then serves as a fixing support for all or part of the distal 53 and proximal 52 parts which are manufactured taking into account their specificities in connection with the vertebra V1.

As represented in FIG. 5, the system S also includes a robot 60. The robot 60 comprises a fixed station 61, which is fixed relative to an operating table 70 of the system S and which, in the example shown in the figure, forms a bridge table which spans the upper face of the operating table 70. The robot 60 also comprises an arm 62 which is movable in a motorized manner relative to the fixed station 61, being controlled in movement by motorized elements which are integrated into the robot 60 and controlled by a control unit 63 of the robot. The embodiment of the robotic arm 62, in particular with regard to its kinematic capacities and its motorized elements, is not limiting as long as the arm 62 is able to participate in spine surgery. The robot 60 further includes an end effector member 64 which is carried by the arm 62, typically at the end of the latter which is opposite the fixed station 61. As detailed below, the end effector member 64 is able to be applied intraoperatively on vertebrae V1 to V5. In the embodiment illustrated in the figures, the end effector member 64 is equipped with a tool 65 which is able to perform at least one of the surgical acts which have been planned during the planning stage, described above. In the context of the surgical example in connection with the holes T to be drilled in the vertebrae V1 to V5, the tool 65 is typically a drill bit able to drill the hole or holes T in the vertebra V1. In practice, the robot 60 is a device which, as such, is commercially available.

Also as represented in FIG. 5, the system S also includes an optical sensor device 80 which is at least partially carried by the end effector member 64. In the embodiment considered in FIG. 5, the optical sensor device 80 includes a three-dimensional camera 81 which is carried by the end effector member 64. In the present document, the term "three-dimensional camera" means an optical sensor which captures three-dimensional data using an optical technique such as laser profiling, projection of fringes or time of flight. Among the time of flight optical techniques, we can notably mention laser remote sensing, usually called LIDAR (acronym for the English expression "light detection and ranging"). Thus, according to a preferred embodiment, the three-dimensional camera 81 is an optical sensor using laser triangulation to calculate the distance separating it from an object based on the deformation of a laser line projected onto this object; the three-dimensional camera 81 can thus advantageously use LIDAR technology to determine the positioning in space of a device whose shape it recognizes. More generally, the three-dimensional camera 81 of the system S presents the advantage of being as close as possible to the vertebral localization element 50, which gives it good precision in the positioning of this vertebral localization element 50. Furthermore, this proximity also allows to reduce the size of the vertebral localization element 50, the balls 57 of which do not need to be as spaced apart as if they were observed several meters from the site of the intervention and therefore from the vertebral localization element 50.

Whatever the embodiment of the three-dimensional camera 81, it allows, when the vertebral localization element 50 is coupled to the vertebra V1, to observe the marker 56 of this vertebral localization element 50 and to deduce therefrom in real time positioning data concerning the relative positioning between this marker 56 and the end effector member 64. Of course, this is based on the fact that the position of the three-dimensional camera 81 on the end effector member 64 is known in a pre-established manner and updated in an ad hoc manner in the three-dimensional camera 81, this position being able to be either fixed as soon as the three-dimensional camera 81 is fixedly secured to the end effector member 64, or controllable in movement according to precise and controlled kinematics, as illustrated by the dotted-line arrows in FIG. 5.

In the embodiment of FIG. 5, the optical sensor device 80 is advantageously able to, when the vertebral localization element 50 is coupled to the vertebra V1, observe and read the barcode 58 of the vertebral localization element 50. For this purpose, the optical sensor device 80 includes an optical sensor, for example two-dimensional, able to read the graphic symbols of the barcode 58 and to deduce therefrom the information integrated into this barcode. Multiple embodiments, known as such in the art, are possible for this optical sensor, it being understood that the latter is advantageously integrated into the three-dimensional camera 81.

Also as represented in FIG. 5, the system S includes a processing unit 90, typically electronic, which is designed to process both the set of data E and the positioning data determined by the three-dimensional camera 81 or, more generally, by the optical sensor device 80, as well as to advantageously process the barcode information 58, read by the optical sensor device 80. The processing unit 90 is advantageously designed to also produce control instructions intended for the robot 60, sent to the control unit 63 of this latter. The transmission of data between the processing unit 90, the optical sensor device 80 and the control unit 63 of the robot 60 is carried out by any appropriate means, in particular wired or wireless. In practice, the processing unit 90 notably comprise a microprocessor and is typically integrated into a computer unit, these hardware aspects of the processing unit 90 not being limiting. The functional capacities of the processing unit 90 will appear more clearly through the remainder of the description, which relates to the intraoperative steps of the method implemented using the system S.

During a first intraoperative step of the method, the patient to be operated on is anesthetized after having been laid on his stomach on the operating table 70, as illustrated in FIG. 5. The surgeon then performs the approach to the spine of the patient so as to expose, without altering, an area of vertebra V1. The exposed area is thus cleared of any soft part, such as skin, flesh, etc., to leave the bony material of this area of the vertebra V1 in the open air. The area thus exposed includes at least the predetermined bony part of the vertebra V1, on which the vertebral localization element 50 is designed to be placed in the aforementioned unique fixed position, by means of cooperation by contact between this predetermined bony part of the vertebra V1 and the mating surface 55 of the vertebral localization element 50. The exposed area can advantageously be limited to the unique predetermined bony part of the vertebra V1, thus being exposed by an approach that can be described as minimally invasive and which, here, concerns only one lateral side, namely the right side, of vertebra V1, by means of a reduced lateralized incision of the spine of the patient. Alternatively, the exposed area can, of course, be further extended, being then exposed by a wide open approach, where applicable concerning the two lateral sides of the spine.

During a second intraoperative step, the surgeon uses the vertebral localization element 50, by applying the mating surface 55 of the latter to the exposed area of the vertebra V1 so as to place the body 51 on the vertebra V1 in the unique fixed position having been defined above. The vertebral localization element 50 is then in the configuration illustrated in FIGS. 5 to 7. Once coupled to the vertebra V1, here to the right half of this vertebra V1, the vertebral localization element 50 can be released by the surgeon, while remaining fixedly in place on the vertebra V1, in a stable manner. The surgeon can then easily visually check the operating site, especially since the body 51 is particularly compact, in particular thanks to the tapering of its intermediate part 54.

During a third intraoperative step, after the robot 60, the optical sensor device 80 and the processing unit 90 have been activated, the three-dimensional camera 81 is placed facing the marker 56 of the vertebral localization element 50. By observing the marker 56 of the vertebral localization element 50 coupled to the vertebra V1, the three-dimensional camera 81 determines in real time the relative positioning between this marker 56 and the end effector member 64 of the robot 60, as explained above. The corresponding positioning data, thus determined by the three-dimensional camera 81, is transmitted instantaneously to the processing unit 90 which, from these positioning data and from the preoperative mapping set of data E, calculates in real time the relative positioning between the end effector member 64 and the vertebra V1. For the processing unit 90, this amounts to, in the spatial frame which is defined by the marker 56 and which is fixedly linked to the vertebra V1 according to a known position, calculating in real time the position of the end effector member 64 and compare this position with the region of space occupied by vertebra V1 as modeled by the preoperative mapping data relating to this vertebra V1. This obviously assumes that the vertebra to which the vertebral localization element 50 is coupled is identified by the processing unit 90 as being the vertebra V1, which advantageously results from the reading of the barcode 58 by the optical sensor device 80 which transmits the information of this barcode 58 to the processing unit 90; alternatively, this can also result from an ad hoc entry of the corresponding information into the processing unit 90 by the surgeon. In any case, it is understood that the notion of "real time" implies that the optical sensor device 80 and the processing unit 90 are intrinsically capable of controlling and driving the arm 62 of the robot 60 at a speed adapted to the possible movements of the vertebra V1 and therefore of the marker 56 observed by the three-dimensional camera 81, these possible movements being linked for example to the breathing of the patient, to spasms of the patient or to an unexpected external shock suffered by the operating table 70. This capacity of real-time processing is linked to a high frequency of updating the determination of the relative positions concerned. For example, this frequency is of the order of 100 kHz. The system S thus allows to correct in real time the displacement of the end effector member 64 during its application on the vertebra V1 as a function of the possible movements of the latter.

In the extension of the preceding considerations, the processing unit 90 is advantageously provided for, during the third intraoperative step, to exploit the planning data defined above, so as to elaborate in real time, from this planning data and from the calculation performed by the processing unit 90, the relative positioning between the end effector member 64 and the vertebra V1, the control instructions which are sent to the control unit 63 of the robot 60 to apply the tool 65 of the end effector member 64 to the vertebra V1, by the arm 62, so as to perform at least one of the surgical acts corresponding to the planning data. In the context of the surgical example in connection with the holes T to be drilled in the vertebrae V1 to V5, the bit forming the tool 65 is thus applied by the arm 62 directly to the vertebra V1 to drill a hole there, the orientation of the central axis, the point of entry and the depth of which respect those planned during the preoperative planning stage. When this bit is applied to the vertebra V1, any unexpected movement of this latter induces, by means of the three-dimensional camera 81 and the processing unit 90, a positional recalculation therefore allowing to update the control instructions so that the processing unit 90 sends to the control unit 63 of the robot 60. In practice, the planning data is supplied to the processing unit 90 either by extraction directly from the data set E, or preferably by means of the optical sensor device 80 reading the barcode 58 in which the information corresponding to the planning data relative to the vertebra V1 has been integrated.

Throughout the entire actuation of the robot 50 during the third intraoperative step, the marker 56 remains easily and effectively observable by the three-dimensional camera 81 because this latter is mounted on the end effector member 64. This operational proximity between the marker 56 and the three-dimensional camera 81 is particularly beneficial for the precision of optical tracking, while significantly limiting the risk of interruption of optical tracking by occlusion between the marker 56 and the three-dimensional camera 81. Furthermore, the complexity of the calculations performed by the means 90 remain moderate because it can advantageously be limited to the calculation of the positioning of three points respectively associated with the balls 57, typically the respective centers of the balls 57, allowing the location in space of the vertebra V1 and the relative positioning of the end effector member 64 relative to said vertebra V1.

The method then continues taking into account the preoperative planning, repeating if necessary the third intraoperative step in order to drill in the vertebra V1 one or more other holes T, then repeating the second and third intraoperative steps but applying them successively to each of the vertebrae V2 to V5 to drill the various other holes T therein. Of course, to repeat the second intraoperative step by applying it to the vertebrae V2 to V5, it is necessary to have, for each of these vertebrae V2 to V5, a vertebral localization element which is functionally similar to the vertebral localization member 50 described hitherto, but which is specific to the vertebra concerned, by having its mating surface which is specific to the vertebra concerned and by having its own barcode, the information of which relates to the vertebra concerned.

At the end of the method, the vertebrae V1 to V5 find themselves drilled with the holes T which were planned during the preoperative planning stage, each of these holes having been drilled by the robot 60.

Figure 8:
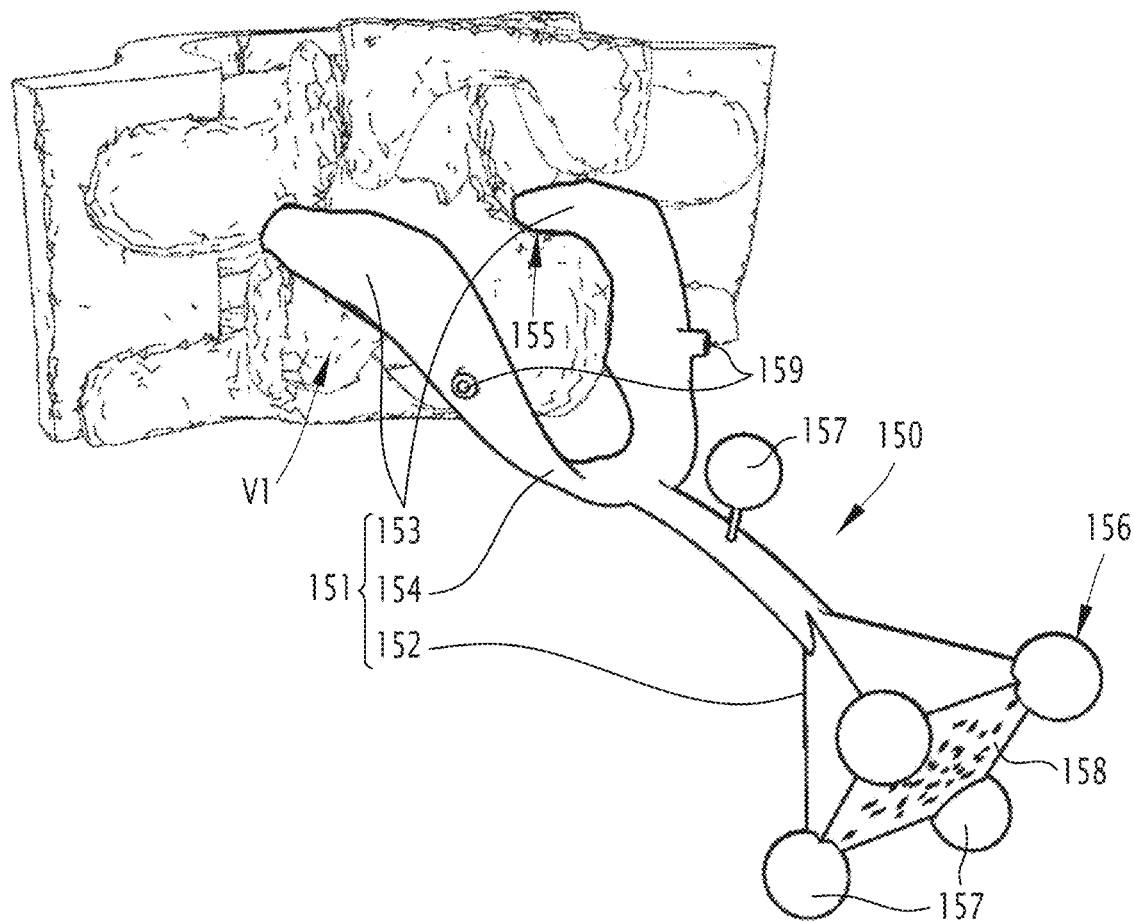
FIG. 8 is a view similar to FIG. 6, illustrating a variant of the corresponding part of the system.

In FIG. 8 is represented a variant of the vertebral localization element 50, referenced 150. The vertebral localization element 150 is functionally similar to the vertebral localization member 50, but differs structurally from it in that its mating surface 155, which is functionally similar to mating surface 55, is designed to be applied in customized contact simultaneously with the bony material of the left half of vertebra V1 and the bony material of the right half of this vertebra V1. For this purpose, the vertebral localization element 150 includes a body 151 of which a distal part 153, which delimits the mating surface 155, is distributed on either side of the spinous process of the vertebra V1 when the vertebral localization element 150 is coupled by its mating surface 155 to the vertebra V1, in particular to the left and right laminae of the latter, as illustrated in FIG. 8. Of course, the surgical gestures which are implemented at the first and second intraoperative steps are adapted accordingly.

In the embodiment envisaged in FIG. 8, the body 151 of the vertebral localization element 150 includes a proximal part 152, which is functionally and structurally similar to the proximal part 52, in particular being provided with a marker 156 and a barcode 158 which are respectively similar to the marker 56 and the barcode 58. The body 151 also includes an intermediate part 154 which connects one or other of the proximal 152 and distal 153 parts to each other by forming an arch, which overlaps the spinous process of the vertebra V1 when the vertebral localization element 250 is coupled to vertebra V1 and which incorporates two cannulas 159 individually similar to cannula 59.

Figure 9:
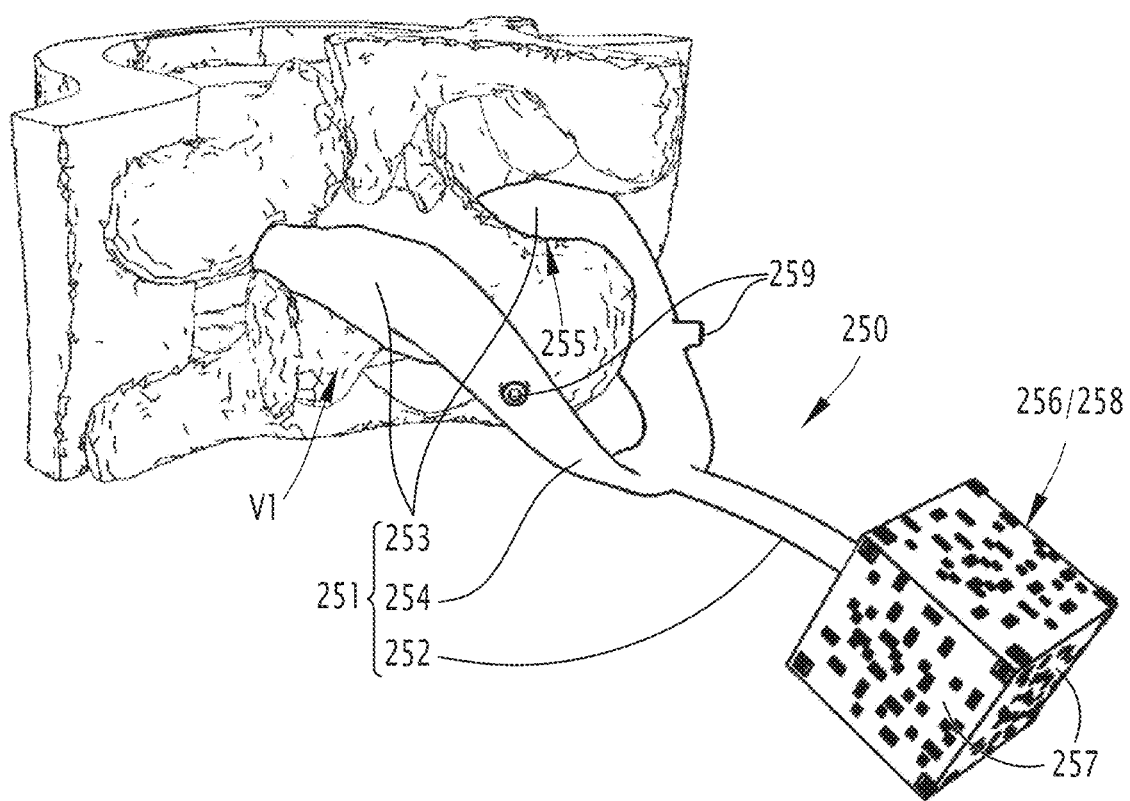
FIG. 9 is a view similar to FIG. 6, illustrating another variant of the corresponding part of the system.
Figure 10:
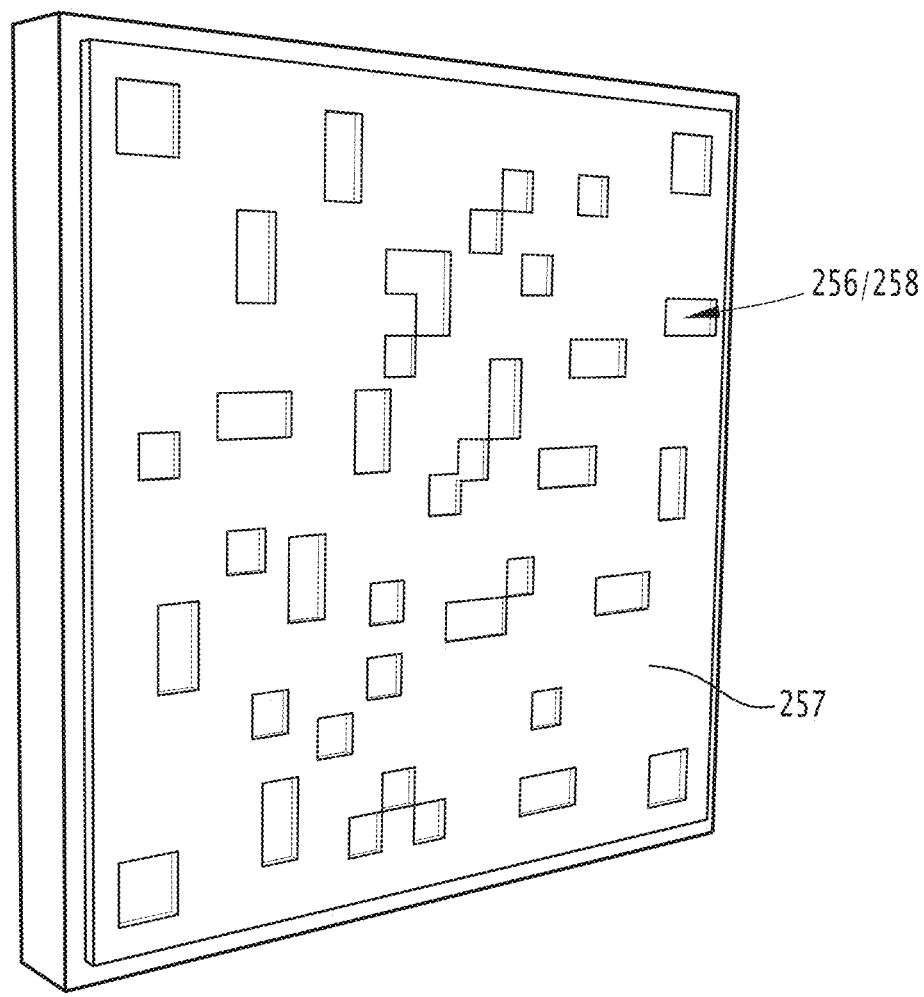
FIG. 10 is a perspective view of a fragment of the part of the system, shown in FIG. 9.

In FIG. 9 is shown a variant of the vertebral localization element 150, referenced 250. The vertebral localization element 250 is functionally similar to the vertebral localization element 50 or 150, but differs structurally from the vertebral localization element 150 by, on the one hand, the embodiment of its three-dimensional optical marker, which is referenced 256 and which is functionally similar to the marker 56 or 156, and, on the other hand, the fact that its barcode 258, which is functionally similar to the barcode 58 or 158, is not two-dimensional, but three-dimensional, partly constituting the marker 256. To this end, the faces 257 of the marker 256, observable by the three-dimensional camera 81 of the optical sensor device 80 when the vertebral localization element 250 is coupled to the vertebra V1, each integrate three-dimensional patterns jointly forming the barcode 258, one of its faces 257 being shown alone in FIG. 10. Due to their three-dimensional relief, the three-dimensional patterns of the faces 257 ensure a function similar to the balls 57 of the marker 56, in particular a spatial frame which is fixedly linked to the marker 256 and which can be located by the three-dimensional camera 81. Due to their graphics, the patterns on the three-dimensional faces 257 also make it possible to provide a function similar to barcode 58 or 158, in particular by integrating information identical to that described above for barcode 58.

In the embodiment considered in FIG. 9, the marker 256 and the barcode 258 are delimited by a proximal part 252 of a body 251 of the vertebral localization element 250, this proximal part 252 being functionally similar to the proximal part 52 or 152 of the vertebral localization elements 50 and 150. This vertebral localization element 250 includes a distal part 253, which is functionally and structurally similar to the distal part 153, in particular being provided with a mating surface 255 similar to the mating surface 155, as well as an intermediate part 254 which is functionally and structurally similar to the intermediate part 154, in particular being provided with cannulas 259 which are similar to the cannulas 159.

Figure 11:
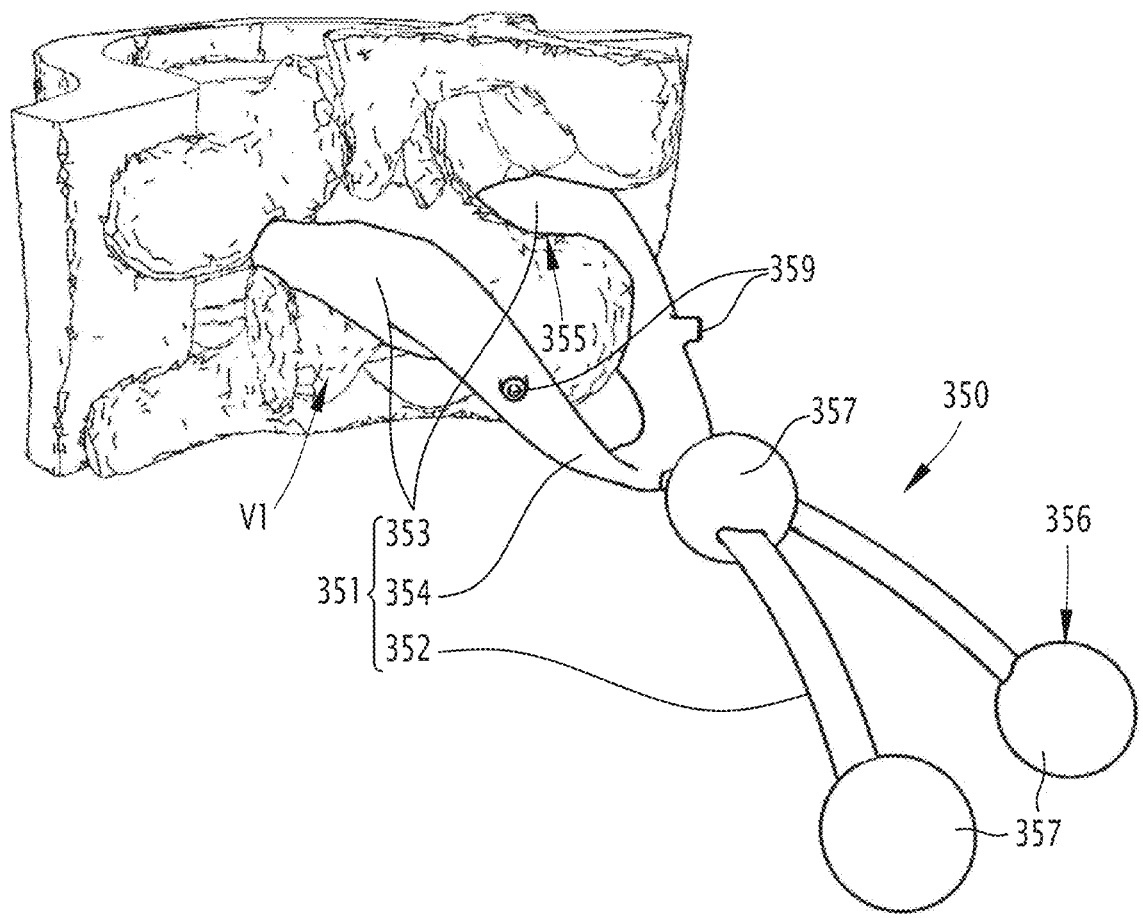
FIG. 11 is a view similar to FIG. 6, illustrating yet another variant of the corresponding part of the system.

In FIG. 11 is represented a variant of the vertebral localization element 150, referenced 350. The vertebral localization element 350 is functionally similar to the vertebral localization element 50, 150 or 250, with the difference that the vertebral localization element 350 does not have a barcode, such as the barcodes 58, 158 and 258. The vertebral localization element 350 can thus be used to replace the vertebral localization element 50, 150 or 250 as soon as integration is renounced, in the form of a barcode, information similar to that detailed above in connection with the barcode 58. As mentioned above, this information is then to be provided to the processing unit 90 other than by reading a barcode integrated into the vertebral localization element 350, in particular by entering this information directly into the processing unit 90, where applicable by extraction from the set of data E for a part of this information.

In the embodiment considered in FIG. 11, the vertebral localization element 350 includes a three-dimensional optical marker, which is referenced 356 and which, while being functionally similar to the marker 56 or 156, is structurally different from these latter, in comprising balls 357 which are functionally similar to the balls 57 but which are here arranged differently relative to each other. The marker 356 is delimited here by a proximal part 352 of a body 351 of the vertebral localization element 350. This vertebral localization element 351 includes a distal part 353, which is functionally and structurally similar to the distal part 153, in particular being provided with a mating surface 355 which is similar to the mating surface 155, as well as an intermediate part 354, which is functionally and structurally similar to the part 154, in particular being provided with cannulas 359 similar to the cannulas 159.

Figure 12:
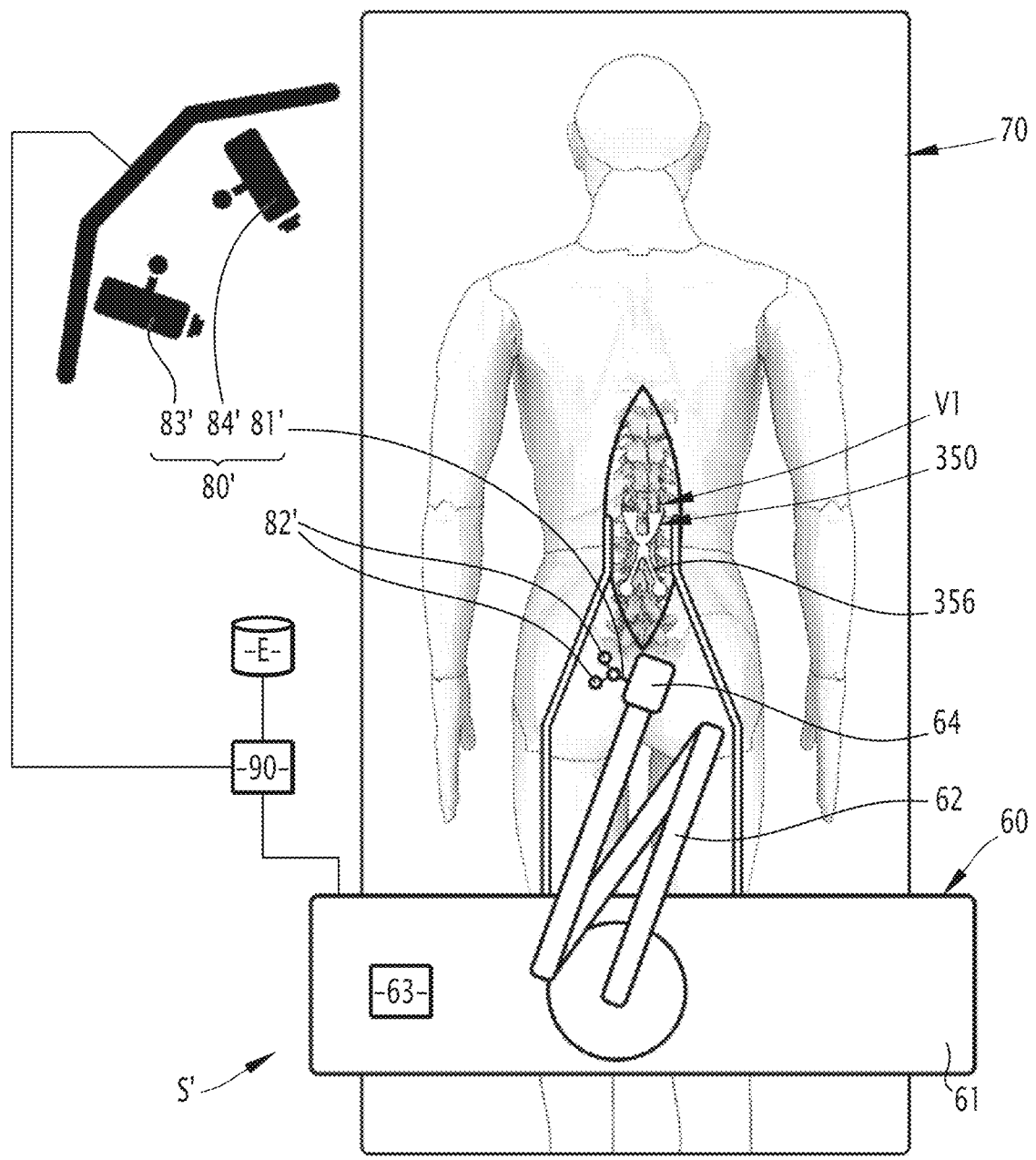
FIG. 12 is a view similar to FIG. 5, illustrating an alternative embodiment for some of the corresponding parts of the system.

In FIG. 12 is represented an alternative embodiment of the system S, referenced S'. This system S' includes the vertebral localization element 350, the robot 60, the operating table 70 and the processing unit 90 of the system S, but, unlike this latter, does not have the optical sensor device 80 in favor of an optical sensor device 80'. The optical sensor device 80' is functionally similar to the optical sensor device 80, but differs structurally. To this end, the optical sensor device 80' includes a three-dimensional optical marker, which is referenced 81' and which is carried, in particular fixedly, by the end effector member of the robot 60, as clearly visible in FIG. 12. Even though separate from the marker 356 of the vertebral localization element 350, the marker 81' has a similar purpose to the marker 356 but applied to the end effector member 64, in the sense that the marker 81' allows it to locate in space the end effector member 64 optically. To do this, the marker 81' includes for example, the balls 82', similar to the balls 357 of the marker 356, but other embodiments are possible for the marker 81'. In all cases, the optical sensor system 80' also includes at least two two-dimensional cameras 83' and 84' which, as schematically illustrated in FIG. 12, allow, when the vertebral localization element 350 is coupled to the vertebra V1, to observe, according to respective viewing angles, which are different from each other, both the marker 356 and the marker 81'. The two-dimensional cameras 83' and 84' are designed to deduce, from their observation of the markers 356 and 81', the relative positioning between the marker 356 and the end effector member 64. It is understood that the positioning data thus determined by the two two-dimensional cameras 83' and 84' are similar to those determined by the unique three-dimensional camera 81. The positioning data determined by the two-dimensional cameras 83' and 84' is supplied to the processing unit 90 to enable the latter to calculate in real time the relative positioning between the end effector member 64 and the vertebra V1, as explained above for the system S.

In variants not shown, the surgical act performed by the robot 60 of the system S or S' on the vertebrae V1 to V5 is not limited to the drilling of holes. More generally, the surgical act(s) that can be performed by the robot 60 consist in applying energy that cuts into the bony material of the vertebrae, this energy possibly being of a mechanical, radiative, laser, nature etc. The tool 65 of the end effector member 64 of the robot 60 is chosen accordingly, being appropriate to the nature of the surgical act to be performed by the robot 60. During the same surgical intervention, this tool 65 is moreover interchangeable.

Also as a variant not shown, rather than using the robot 60 to perform a surgical act as envisaged above, the robot 60 can, both in the system S and in the system S', be used to assist a surgical act performed by the surgeon, for example to guide a gesture of the surgeon applying a piercing or other tool to the vertebrae. In this case, during the preoperative planning stage, the planning data is calculated which corresponds to an action of assistance to the surgical act and are based on the preoperative mapping data. Then, during the intraoperative step in which the surgical act is performed by the surgeon, the tool 65 of the end effector member 64 is replaced by an ancillary device able to perform the corresponding assistance action. The assistance action is carried out by the robot 60: from the planning data corresponding to the assistance action, as well as from the calculation of the relative positioning between the end effector member 64 and the vertebra V1, the control instructions are produced in real time by the processing unit 90 and sent to the robot 60 so that the ancillary device is placed vis-a-vis the vertebra V1 by the arm 62 so as to perform the assistance action, while the surgical act is performed by the surgeon, assisted by the ancillary device.

Finally, various adjustments and options to the systems S and S', as well as to the method described so far, are possible. In particular, the different embodiments mentioned above for respective parts of the system S or S' can be associated according to all possible combinations to give new embodiments. For example, the distal and intermediate parts of the body 251 or 351 of the vertebral localization elements 250 and 350 are replaceable by the distal 53 and intermediate 54 parts of the body 51. Similarly, the vertebral localization element 50 may be associated with the three-dimensional barcode shown schematically in FIG. 10 instead and in place of the two-dimensional barcode 58. In this configuration, the optical sensor device 80 no longer includes an optical sensor and is limited to a three-dimensional camera allowing, on the one hand, to determine the position of the vertebral localization element 50 relative to the end effector member 64 and on the other hand to read the information contained in the aforementioned three-dimensional barcode.

The invention claimed is:

1. A spine surgery system, comprising:
   an electronic processor having preoperative mapping data relative to one or more vertebrae of a patient loaded thereon;
   a vertebral localization element comprising
     a patient-specific mating surface which is specific to the patient, the mating surface being configured to be congruent with a predetermined bony part of the vertebra or one of the vertebrae, to couple the vertebral localization element to the vertebra in a unique fixed position, applying the mating surface in customized contact with bony material of the vertebra so that the mating surface covers the predetermined bony part of the vertebra, by matching the bony reliefs of the predetermined bone portion and by cooperating by contact with the bony reliefs in a three-dimensional manner to place the vertebral localization element on the vertebra in said unique fixed position, and a three-dimensional optical marker, defining a three-dimensional spatial frame which is fixedly linked to the mating surface so that, when the vertebral localization element is coupled to the vertebra, said three-dimensional spatial frame is fixedly linked to the vertebra according to a relative position resulting from the coupling of the vertebral localization element to the vertebra in said unique fixed position;

a robot comprising an arm which is movable relative to a fixed station of the robot, and an end effector member which is carried by the arm and which is configured to be applied intraoperatively on the vertebra; and an optical sensor device, which is carried by and movable with the end effector member relative to the fixed station of the robot and which is configured, when the vertebral localization element is coupled to the vertebra, to observe the three-dimensional optical marker of the vertebral localization element and to deduce therefrom, in real time, the positioning data concerning the relative position between the three-dimensional optical marker and the end effector member, wherein the electronic processor, from said preoperative mapping data and said positioning data, determines, in real time, the relative position between the end effector member and the vertebra, by calculating, in said three-dimensional spatial frame, the position of the end effector member and by comparing the position of the end effector member with a region of space occupied by the vertebra as modeled by said preoperative mapping data.

2. The spine surgery system according to claim 1, further comprising a planner, which is configured to preoperatively plan at least one surgical act to be performed on the vertebra and to calculate planning data corresponding to the at least one surgical act, based on the preoperative mapping data, wherein the end effector member is equipped with a tool configured to perform the at least one surgical act, and wherein the electronic processor elaborates in real time, from the calculation of the relative position between the end effector member and the vertebra, calculated by the electronic processor, and from said planning data, control instructions sent to the robot to cause the tool of the end effector member to be applied directly to the vertebra by the arm to perform the at least one surgical act.

3. The spine surgery system according to claim 2, wherein the vertebral localization element is provided with a barcode integrating both information corresponding to the planning data and information relative to identification of the vertebra to which the vertebral localization element is to be coupled, and wherein the optical sensor device is configured, when the vertebral localization element is coupled to the vertebra, to observe and read the barcode.

4. The spine surgery system according to claim 1, wherein the vertebral localization element is provided with a barcode integrating information relative to identification of the vertebra to which the vertebral localization element is to be coupled, and wherein the optical sensor device is configured, when the vertebral localization element is coupled to the vertebra, to observe and read the barcode.

5. The spine surgery system according to claim 4, wherein the barcode is two-dimensional.

6. The spine surgery system according to claim 4, wherein the barcode is three-dimensional and at least partially constitutes the three-dimensional optical marker of the vertebral localization element.

7. The spine surgery system according to claim 1, wherein the optical sensor device includes a three-dimensional camera, which is carried by the end effector member and which determines said positioning data.

8. The spine surgery system according to claim 1, wherein the optical sensor device comprises:

a three-dimensional optical marker, which is distinct from the three-dimensional optical marker of the vertebral localization element and which is carried by the end effector member, and at least two two-dimensional cameras which are configured, when the vertebral localization element is coupled to the vertebra, to observe, according to respective viewing angles, which are different the one from the other, at the same time the three-dimensional optical marker of the vertebral localization element and the three-dimensional optical marker of the optical sensor device and deduce said positioning data in real time.

9. The spine surgery system according to claim 1, wherein the mating surface is configured to be applied in customized contact with bony material of only one half, left or right, of the vertebra.

10. The spine surgery system according to claim 1, wherein the mating surface is designed configured to be applied in customized contact with bony material of the left half of the vertebra and bony material of the right half of the vertebra.

11. A spine surgery method, comprising:

producing the spine surgery system according to claim 1;

coupling the vertebral localization element to the vertebra in the unique fixed position, by applying the mating surface in customized contact with the bony material of this the vertebra so that the mating surface covers the predetermined bony part of the vertebra, by matching the bony reliefs of the predetermined bony part and by cooperating by contact with the bony reliefs in the three-dimensional manner to place the vertebral localization element on the vertebra in said unique fixed position, to fixedly link the three-dimensional spatial frame to the vertebra according to the relative position resulting from the coupling of the vertebral localization element to the vertebra in said unique fixed position, after the vertebra has been exposed, intraoperatively coupling the vertebral localization element to the vertebra in said unique fixed position, the three-dimensional optical marker of the vertebral localization element being observed by the optical sensor device which is at least partially carried by the end effector member and which deduces in real time the positioning data concerning the relative positioning between the three-dimensional optical marker and the end effector member; and from the preoperative mapping data and from the positioning data, determining the relative positioning between the end effector member and the vertebra in real time, by calculating, in said three-dimensional spatial frame, the position of the end effector member and comparing the position of the end effector member with the region of space occupied by the vertebra as modeled by the preoperative mapping data.

12. The spine surgery method according to claim 11, wherein further comprising:
- preoperatively planning at least one surgical act to be performed on the vertebra;
- calculating planning data corresponding to the at least one surgical act, the planning data being based on the preoperative mapping data, the end effector member being fitted with a tool configured to perform the at least one surgical act; and
- developing in real time, from calculation of the relative positioning between the end effector member and the vertebra, and from the planning data, control instructions sent to the robot so that the tool of the end effector member is applied directly to the vertebra by the arm in order to perform the at least one surgical act.

13. The spine surgery method according to claim 12, wherein the surgical act consists of drilling a hole in the vertebra,
wherein the planning data includes an orientation of a central axis of the hole relative to the vertebra, an entry point of the hole on the vertebra, and a depth of the hole in the vertebra, and wherein the tool is a drill bit.

14. The spin surgery method according to claim 11, further comprising:
- preoperatively planning at least one assistance action for a surgical act to be performed on the vertebral is planned preoperatively,
- calculating planning data corresponding to the at least one assistance action, the planning data being based on the preoperative mapping data, the end effector member being equipped with an ancillary device configured to perform the at least one assistance action; and
- from calculation of the relative positioning between the end effector member and the vertebra, and from the planning data, sending control instructions developed in real time to the robot so that the ancillary device is placed vis-a-vis the vertebra by the arm to perform the at least one assistance action, while the surgical act is carried out by a surgeon, being assisted by the ancillary device.

15. The spine surgery method according to claim 11, wherein the preoperative mapping data comes from CT scan images of the vertebrae.

16. The spine surgery method according to claim 11, wherein the mating surface is fabricated using the preoperative mapping data.

17. The spine surgery method according to claim 11, further comprising:
- preoperatively selecting, among the preoperative mapping data, data of interest, which relates to at least one anatomically remarkable region of the vertebra,
- wherein the mating surface is fabricated using the data of interest in a manner, intraoperatively, to be applied in customized contact with bony material of said at least one anatomically remarkable region.

18. The spine surgery method according to claim 11, wherein the preoperative mapping data is segmented to form groups of data which are respectively relative to the vertebrae of the patient.

19. The spine surgery method according to claim 11, wherein intraoperatively, the patient is anesthetized and lying on his stomach on an operating table that is fixed relative to the fixed station of the robot.

20. The spine surgery method according to claim 11, wherein no X-ray imaging device is used intraoperatively.

* * * * *